United States Patent
Le Callet et al.

(10) Patent No.: US 9,794,554 B1
(45) Date of Patent: Oct. 17, 2017

(54) METHOD FOR DETERMINING A VISUAL QUALITY INDEX OF A HIGH DYNAMIC RANGE VIDEO SEQUENCE

(71) Applicants: Centre National de la Recherche Scientifique—CNRS, Paris (FR); Universite de Nantes, Nantes (FR)

(72) Inventors: Patrick Le Callet, Le Pallet (FR); Matthieu Perreira Da Silva, Nantes (FR); Manish Narwaria, Gujarat (IN)

(73) Assignees: CENTRE NATIONAL DE LA RECHERCHE SCIENTIFIQUE—CNRS, Paris (FR); UNIVERSITE DE NANTES, Nantes (FR)

( * ) Notice: Subject to any disclaimer, the term of this patent is extended or adjusted under 35 U.S.C. 154(b) by 62 days.

(21) Appl. No.: 15/087,578

(22) Filed: Mar. 31, 2016

(51) Int. Cl.
*G06K 9/00* (2006.01)
*H04N 17/02* (2006.01)
*G06K 9/62* (2006.01)

(52) U.S. Cl.
CPC ........... *H04N 17/02* (2013.01); *G06K 9/6215* (2013.01)

(58) Field of Classification Search
CPC ........................ H04N 17/02; G06K 9/6215
See application file for complete search history.

(56) References Cited

U.S. PATENT DOCUMENTS

| | | | | |
|---|---|---|---|---|
| 5,446,492 A * | 8/1995 | Wolf | ........................ | H04N 5/04 348/180 |
| 5,574,500 A * | 11/1996 | Hamada | ................. | H04N 17/06 348/180 |
| 5,940,124 A * | 8/1999 | Janko | .................... | H04N 17/004 348/180 |
| 6,363,116 B1 * | 3/2002 | Edwards | .............. | H04N 17/004 348/E17.003 |
| 6,493,023 B1 * | 12/2002 | Watson | ................ | H04N 17/004 348/180 |
| 6,690,839 B1 * | 2/2004 | Ferguson | ................ | G06T 7/001 348/192 |
| 6,704,451 B1 * | 3/2004 | Hekstra | ..................... | G06T 9/00 348/192 |

(Continued)

OTHER PUBLICATIONS

Article, Field, *Relations between the statistics of natural images and the response properties of cortical cells* Journal of the Optical Society of America, vol. 4, No. 12, Dec. 1987, pp. 2379-2394.

(Continued)

*Primary Examiner* — John Strege
(74) *Attorney, Agent, or Firm* — Brinks Gilson & Lione; G. Peter Nichols

(57) ABSTRACT

A method for determining objectively a visual quality index of at least one high dynamic range video sequence, referred to as an HDR sequence, distorted by image processing operations and issued from a reference high dynamic range video sequence, referred to a reference sequence or a reference HDR sequence. The method is based on signal pre-processing, transformation, and subsequent frequency based decomposition. Video quality is then computed based on a spatio-temporal analysis that relates to human eye fixation behavior during video viewing. One advantage of this method is that it does not involve expensive computations.

9 Claims, 3 Drawing Sheets

(56) References Cited

U.S. PATENT DOCUMENTS

| | | | | |
|---|---|---|---|---|
| 6,943,827 | B2* | 9/2005 | Kawada | H04N 17/00 348/180 |
| 7,715,592 | B1* | 5/2010 | Hollier | H04N 17/00 348/192 |
| 2003/0161406 | A1* | 8/2003 | Lee | H04N 17/004 375/240.19 |
| 2008/0285651 | A1* | 11/2008 | Au | H04N 19/176 375/240.16 |
| 2009/0274390 | A1* | 11/2009 | Meur | G06T 7/0002 382/275 |
| 2010/0284624 | A1* | 11/2010 | Ninassi | G06T 7/001 382/224 |
| 2012/0020415 | A1* | 1/2012 | Yang | H04N 17/004 375/240.27 |
| 2013/0027615 | A1* | 1/2013 | Li | H04N 17/02 348/571 |
| 2013/0100350 | A1* | 4/2013 | Gu | H04N 17/004 348/571 |
| 2014/0022460 | A1* | 1/2014 | Li | G06T 5/009 348/708 |
| 2015/0168293 | A1* | 6/2015 | Baker | G01N 21/251 702/182 |
| 2015/0243041 | A1* | 8/2015 | Panetta | G06K 9/4652 382/164 |

OTHER PUBLICATIONS

Article, Aydin et al., *Extending quality metrics to full luminance range images*, Proceedings of the SPIE, vol. 6806, Human Vision and Electronic Imaging XIII, pp. 68060B-68060B-10, Feb. 13, 2008.

Article, Narwaria et al., *HDR-VQM: An objective quality measure for high dynamic range video*: Signal Processing: *Image Communication* 35, pp. 46-60, Apr. 22, 2015.

* cited by examiner

METHOD FOR DETERMINING A VISUAL QUALITY INDEX OF A HIGH DYNAMIC RANGE VIDEO SEQUENCE

BACKGROUND

The present invention relates generally to the field of the High Video Range (HDR) video sequences and more specifically to determine a visual quality index for such HDR video sequences after being distorted by image processing operations.

BACKGROUND

The advent of better technologies in the field of visual signal capture and processing has fueled a paradigm shift in todays' multimedia communication systems. As a result, the notion of network-centric quality of service (QoS) in multimedia systems is being extended by relying on the concept of quality of experience (QoE). In this quest of increasing the immersive video experience and the overall QoE of the end user, newer technologies such as 3D, ultra-high definition (UHD) and, more recently, high dynamic Range (HDR) imaging have gained prominence within the multimedia signal processing community. HDR in particular has attracted attention since it in a way revisits the way we capture and display natural scenes. This is motivated by the fact that natural scenes often exhibit large ranges of illumination values. However, such high luminance values often exceed the capabilities of the traditional low dynamic range (LDR) capturing and display devices. Consequently, it is not possible to properly expose the dark and the bright areas simultaneously in one image or one video during capture. This may lead to over-exposure (saturated pixels that are fully white) and/or under-exposure (very dark or noisy pixels as sensor's response falls below its noise threshold). In both cases, visual information is either lost or altered. HDR imaging focuses on minimizing such losses and therefore aims at improving the quality of the displayed pixels by incorporating higher contrast and luminance.

As a result, HDR imaging has attracted attention from both academia and industry, and there has been interest and effort to develop tools/algorithms for HDR video processing. For instance, there have been recent efforts within the Moving Picture Experts Group (MPEG) for extending High Efficiency Video Coding (HEVC) to HDR. Likewise, the JPEG has announced extensions that will feature the original JPEG standard with support for HDR image compression. Despite of some work on evaluating quality of HDR images and video sequences, there is overall lack of such efforts to quantify and measure the impact of such tools on HDR video quality using both subjective and objective approaches.

It is therefore important to develop objective methods for HDR video quality measurement and benchmark their performance against subjective ground truth.

With regards to visual quality measurement, both subjective and objective approaches can be used. The former involves the use of human subjects to judge and rate the quality of the test stimuli. With appropriate laboratory conditions and a sufficiently large subject panel, it remains the most accurate method. The latter quality assessment method employs a computational model to provide estimates of the subjective video quality. While such objective models may not mimic subjective opinions accurately in a general scenario, they can be reasonably effective in specific conditions/applications. Hence, they can be an important tool towards automating the testing and standardization of HDR video processing algorithms such as HDR video compression, post-processing, inverse video tone mapping, etc., especially when subjective tests may not be feasible.

Therefore, there is a need for a tool for determining automatically a visual quality index of a HDR video sequence that has undergone distortions due to image processing operations such as HDR video compression/decompression, post-processing, inverse video tone mapping.

SUMMARY

The present invention relates to a method for determining a visual quality index of at least one high dynamic range video sequence, called HDR sequence, distorted by image processing operations and issued from a reference high dynamic range video sequence, called reference sequence, each of the HDR sequence and the reference sequence comprising $N_{frame}$ video frames t, with $N \geq 2$ and $t \in [1 \ldots N_{frame}]$, each video frame t comprising a plurality of pixels organized into rows and columns and each pixel having at least a luminance value, said method comprising the steps of:

applying a transformation to the video frames t of the HDR sequence and the reference sequence in order to obtain video frames t of the HDR sequence and the reference sequence in a perceived luminance domain, the transformed luminance values of the video frames t in the perceived luminance domain being substantially linear to the luminance values perceived by the human visual system for the HDR sequence and the reference sequence, computing, for each couple of frames t of the HDR sequence and the reference sequence in the perceived luminance domain, $N_{scale} \times N_{orient}$ similarity frames $Sim_{t,s,o}$ representative of a perceptual similarity between the frame t of the HDR sequence and the frame t of the reference sequence at different spatial scales s and different spatial orientations o, with $s \in [1 \ldots N_{scale}]$ and $o \in [1 \ldots N_{orient}]$, a similarity value being associated to each pixel of the similarity frame $Sim_{t,s,o}$, computing, for each couple of frames t of the HDR sequence and the reference sequence, a global similarity frame $Sim_t$ based on the computed similarity frames $Sim_{t,s,o}$ at the different spatial scales s and the different spatial orientations o, pooling, for each group of q consecutive global similarity frames $Sim_t$, with $q \geq 2$, and for each one of a plurality of spatio-temporal tubes within said group of q consecutive global similarity frames $Sim_t$, the similarity values of the pixels included in said spatio-temporal tubes in order to generate a short term error value for each said spatio-temporal tubes, the short term error values of each spatio-temporal tube being included into an error map, pooling at least a portion of the short term error values of each error map in order to generate a short term quality score for each group of q consecutive global similarity frames $Sim_t$, and computing the visual quality index of the HDR sequence based on said short term quality scores.

According to the invention, the visual quality index is computed based on HDR signal transformation and subsequent analysis of spatio-temporal segments or tubes of the HDR sequence to be qualified and the reference sequence from which the HDR sequence is issued.

According to a particular embodiment, said portion of the short term error values of each error map comprises the m lowest short term error values of the error map, with m being an integer value lower than the total number of short term error values in the error map.

In a particular embodiment, the number m is a predetermined percentage of the total number of short term error values in the error map.

In a particular embodiment, said predetermined percentage is comprised between 5% and 50%.

In a particular embodiment, the method of the invention further comprises a preliminary step, before transforming the HDR sequence and the reference sequence into the perceived luminance domain, said preliminary step consisting in transforming the luminance values of the HDR sequence and the reference sequence into emitted luminance values, said emitted luminance values depending on at least luminance characteristics of the display device used to the video sequences.

In a particular embodiment, the similarity frame $Sim_{t,s,o}$ associated to the frames t of the HDR sequence and the reference sequence for a spatial scale s and a spatial orientation o is computed by the steps of:

applying a log-Gabor filter to the frame t of the HDR sequence and the frame t of the reference sequence in the perceived luminance domain at the spatial scale s and the spatial orientation o, computing an inverse Fourier Transform of the product of the results of the log-Gabor filter for the frame t of the HDR sequence and the frame t of the reference sequence in order to generate a subband frame $l_{t,s,o}^{(HDR)}$ for the frame t of the HDR sequence and a subband frame $l_{t,s,o}^{(REF)}$ or the frame t of the reference sequence, and computing the similarity frame $Sim_{t,s,o}$ based on the subband frames $l_{t,s,o}^{(HDR)}$ and $l_{t,s,o}^{(REF)}$.

In a particular embodiment, the global similarity frame $Sim_t$ is defined by the formula:

$$Sim_t = \frac{1}{N_{scale} \times N_{orient}} \sum_{s=1}^{N_{scale}} \sum_{o=1}^{N_{orient}} Sim_{t,s,o}$$

In a particular embodiment, the spatio-temporal tubes are non-overlapping spatio-temporal tubes.

In a particular embodiment, the video frames t of the HDR sequence and the reference sequence in the perceived luminance domain are generated by applying a perceptually uniform encoding to the video frames t of the HDR sequence and the reference sequence or, when appropriate, to the video frames t of the HDR sequence and the reference sequence issued from said preliminary step (transformation into emitted luminance values).

BRIEF DESCRIPTION OF THE DRAWINGS

The invention can be better understood with reference to the following description and drawings, given by way of example and not limiting the scope of protection, and in which.

Figure 1:
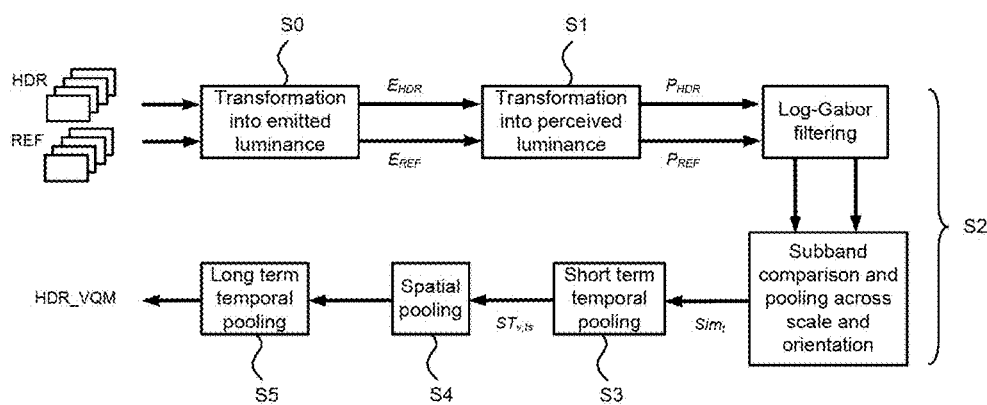
FIG. 1 is a flow chart of the successive steps implemented when performing a method for determining the visual quality index of a HDR sequence according to an embodiment of the invention.

The components in the figures are not necessarily to scale, emphasis instead being placed upon illustrating the principles of the invention.

DETAILED DESCRIPTION

Preliminary information on the human visual system (HVS) and High dynamic range (HDR) video are given in order to properly understand the invention and its context. Humans perceive the outside visual world through the interaction between luminance (measured in candela per square meter, $cd/m^2$) and the eyes. Luminance first passes through the cornea. Then it enters the pupil, an aperture that is modified by the iris, a muscular diaphragm. Subsequently, light is refracted by the lens and hits the photoreceptors in the retina. There are two types of photoreceptors: cones and rods. The cones are located mostly in the fovea. They are more sensitive at luminance levels between $10^{-2}$ $cd/m^2$ to $10^8$ $cd/m^2$ (referred to as the photopic or daylight vision) Furthermore, color vision is due to three types of cones: short, middle and long wavelength cones. The rods, on the other hand, are sensitive at luminance levels between $10^{-6}$ $cd/m^2$ to 10 $cd/m^2$ (scotopic or night vision). The rods are more sensitive than cones but do not provide color vision.

Pertaining to the luminance levels found in the real world, direct sunlight at noon can be of the order in excess of $10^7$ $cd/m^2$ while a starlit night in the range of $10^{-1}$ $cd/m^2$. This corresponds to more than 8 orders of magnitude. With regards to human eyes, their dynamic range depends on the time allowed to adjust or adapt to the given luminance levels. Due to the presence of rods and cones, human eyes have a remarkable ability to adjust to varying luminance levels, both dynamically (i.e. instantaneous) and over a period of time (i.e. adaptation time). Given sufficient adaptation time, the dynamic range of human eyes is about 13 orders of magnitude. However, without adaptation, the instantaneous human vision range is smaller and they are capable of dynamically adjusting so that a person can see about 5 orders of magnitude throughout the entire range.

Since the typical frequency in video signals does not allow sufficient adaptation time, the dynamic vision range (5 orders of magnitude) is more relevant in the context of the present invention as well as HDR video processing in general. However, typical digital imaging sensors (assuming the typical single exposure setting) and LDR displays are not capable of dealing with such large dynamic range present in the real world, and most of them (both capturing sensors and displays) can handle up to 3 orders of magnitude. Due to this limitation, the scenes captured and viewed via LDR technologies will have lower contrast (visual details are either saturated or noisy) and smaller color gamut than what the eyes can perceive. This in turn can decrease the immersive experience quotient of the end-user.

HDR imaging technologies therefore has been developed to overcome the inadequacies of the LDR capture and display technologies via better video signal capture, representation and display, so that the dynamic range of the video can better match the instantaneous range of the eye. In particular, the major distinguishing factor of HDR imaging (in comparison to the traditional LDR one) is its focus on capturing and displaying scenes as natively (i.e. how they appear in the real world) as possible by considering physical luminance of the scene in question. Two important points should, however, be mentioned at the very outset. First, it may be emphasized that in HDR imaging one usually deals with proportional (and not absolute) luminance values. More specifically, unless there is a prior and accurate camera calibration, luminance values in an HDR video file represent the real world luminance up to an unknown scale. This, nonetheless, is sufficient for most purposes. Secondly, the HDR displays currently available cannot display luminance beyond the specified limit, given the hardware limitations. This necessitates a pre-processing step for both subjective and objective HDR video quality measurement, as elaborated further in the step S0. Despite the two mentioned caveats, HDR imaging can improve the viewer experience significantly as compared to LDR imaging. So the present invention seeks to address the issue of objective video quality measurement for HDR video.

FIG. 1 represents a block diagram describing the steps of the method according to a preferred embodiment of the invention. It takes as input the distorted HDR sequence to be analyzed, noted HDR, and the reference HDR sequence, noted REF, from which the HDR sequence is issued. The distortions of the sequence HDR can be the results of video or image processing operations, such as video compression, post-processing, inverse video tone mapping, on the original sequence REF.

As illustrated by FIG. 1, the method comprises the following steps:

step S0: transformation of native input luminance values from the sequence HDR and REF into emitted luminance values;

step S1: transformation of emitted luminance values from the sequence HDR and REF into perceived luminance values;

Step S2: computation of a similarity map $Sim_t$ for each couple of frames t of the sequences HDR and REF representative of the perceptual similarity between the frame t of the sequence HDR and the frame t of the sequence REF;

Step S3: short term temporal pooling on the similarity maps $Sim_t$;

Step S4: spatial pooling; and

Step S5: Long-term temporal pooling.

The steps S0-S5 are described in detail in the following paragraphs.

Step S0

Two observations with regard to HDR video signal representation can be firstly mentioned. First, native HDR signal values are in general only proportional to the actual scene luminance and not equal to it. Therefore, the exact scene luminance at each pixel location is generally unknown. Second, since the maximum luminance values of real-world scenes can be vastly different, the concept of a fixed maximum (or white point) does not exist for HDR values. In view of these two observations, HDR video signals must be interpreted based on the display device. Thus, their values should be advantageously recalibrated according to the characteristics of the HDR display device used to view them. This is unlike the case of LDR video where the format is more standardized, e.g. for 8-bit representation, the maximum value is 255 which would be mapped to the peak display luminance that does not typically exceed 500 $cd/m^2$. With regard to HDR display devices, the inherent hardware limitations impose a limit on the maximum luminance that can be displayed.

Thus, a pre-processing of the HDR video signal is advantageously required in order that the pre-defined maximum luminance point is not exceeded. Specifically, unlike the LDR domain, HDR videos are generally viewed on HDR display devices that may have different peak luminance and/or contrast ratios. Thus, artifact visibility for the same HDR video can be different depending on the display device used e.g. there are different levels of saturation according to peak luminance.

This step S0 can be skipped if the HDR data are already display adapted. This step is therefore optional.

Different strategies from simple ones like linear scaling to more sophisticated ones can be adopted for this pre-processing step. This pre-processing consists for example in rescaling the luminance values with respect to the maximum displayable luminance of the display device used for the HDR sequences. This maximum displayable luminance is equal to 4000 $cd/m^2$ for a SIM2Solar47 HDR display device.

In a variant, a normalization operation is applied on the native luminance values. A normalization factor is determined as the maximum of the mean of top 5% native luminance values of all the frames in the sequence HDR. Specifically, a vector $MT_5$ whose elements are the mean of top 5% luminance values in each frame of the sequence HDR is computed, that is $$MT_5 = \left\{ \frac{1}{|v \in T_5|} \sum_{v \in T_5} N_{v,t} \right\}_{t=1,2,\ldots N_{frame}}$$

where $N_{v,t}$ denotes the native luminance values at spatial location v for the frame t, $N_{frame}$ is the total number of frames of the sequence HDR, $T_5$ denotes the set with highest 5% luminance values in the frame.

Then, the native luminance values N are converted to emitted luminance values E as $$E = \frac{N \times 179}{\max(MT_5)} \quad (1)$$

where the multiplication factor of 179 is the luminous efficacy of equal energy white light that is defined and used by the radiance file format (RGBE) for the conversion to actual luminance value. Then, a clipping function is applied to limit the E values in the range defined by the black point (lowest displayable luminance) and the maximum displayable luminance both depending on the display characteristics.

Step S1:

The step S1 is the transformation of the emitted luminance values of the sequences HDR and REF, noted $E_{HDR}$ and $E_{REF}$ respectively, into perceived luminance values noted $P_{HDR}$ and $P_{REF}$ respectively. This step is required since there exists a non-linear relationship between the perceived and emitted luminance values given the response of the human visual system to different luminance levels. An implication of such non-linearity is that the changes introduced by an HDR video processing algorithm in the emitted luminance may not have a direct correspondence to the actual modification of visual quality. This is different from the case of LDR representation in which the pixel values are typically gamma encoded. Thus, LDR video encodes information that is non-linearly (the non-linearity arising due to the gamma curve) related to the scene luminance. As a result of such non-linear representation, the changes in LDR pixel values can be approximately linearly related to the actual change perceived by the HVS. Due to this, many LDR image/video quality measurement methods directly employ the said gamma encoded pixel values as input and assume that changes in LDR pixels (or changes in features extracted from those pixels) due to distortion can quantify quality degradation (the reference video is always assumed to be of perfect quality). Therefore, to achieve a similar functionality as the LDR domain, the said nonlinearity of the HVS to the emitted luminance should be taken into account for objective HDR video quality evaluation. In this way, the input values to the objective HDR video quality estimator would be expected to be approximately linearly related to the changes induced due to distortions.

According to the Weber law, a short increment of luminance at low level is perceived higher than the same increment at higher luminance level. Therefore, two transformations can be used:
- the logarithmic transformation, or
- the Perceptually Uniform (PU) encoding as disclosed in "Extending quality metrics to full luminance range images" T. Aydin, R. Mantiuk, H. Seidel, Proceedings of the SPIE, vol. 6806, 2008, pp. 68060B-68060B-10.

Figure 2A:
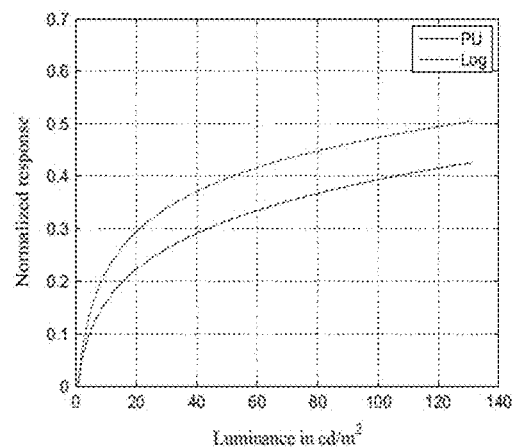
FIG. 2a and FIG. 2b are response curves of luminance values for a logarithmic transform and for a perceptually uniform encoding in two different ranges of luminance.
Figure 2B:
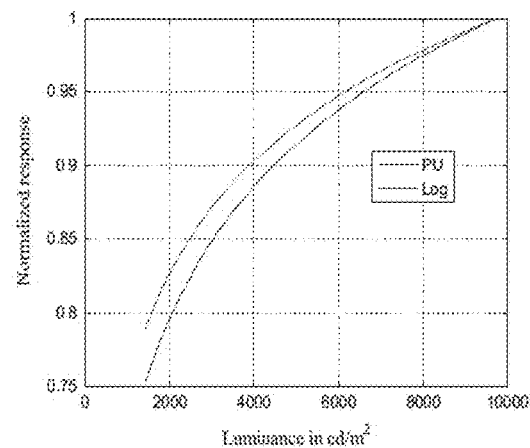

These two transformations can be used to transform the emitted luminance values in the range from $10^{-5}$ to $10^8$ cd/m² into approximately perceptually uniform code values. These two transformations are plotted in FIG. 2a and FIG. 2b. FIG. 2a shows the response of these two transformations to input luminance values which are in the range from 1 to 200 cd/m² and FIG. 2b shows the response of these two transformations to input luminance values which are in the range from 200 to 10 000 cd/m².

From FIG. 2a, it can be noticed that the response of PU encoding is relatively more linear at lower luminance as compared to the logarithmic one.

To further quantify this, it has been found that the linear correlation between the original and transformed signals was 0.9334 for PU encoding and 0.9071 for logarithmic, for the range between 1 and 200 cd/m². On the other hand, both PU and logarithmic curves have a similar response for higher luminance values (above 1000 cd/m²) as shown in FIG. 2b. In this case, the linear correlations were 0.8703 and 0.8763 respectively for PU and logarithmic transformation. Thus, PU encoding better approximates the response of HVS which is approximately linear at lower luminance and increasingly logarithmic for higher luminance values. Due to this, PU encoding is expected to better model the underlying non-linear relationship between HVS's response and emitted luminance.

Therefore, in a preferred embodiment, the step S1 is performed by performing a PU encoding. PU encoding is for example implemented as a look-up table operation in order not to increase substantially the computational overhead.
Step S2

According to the invention, a spatio-temporal comparison of segments of the sequences HDR and REF is performed in order to generate similarity maps for each couple of frames t of the sequences HDR and REF. In a first time, subband signals are generated by applying log-Gabor filters to the luminance values $P_{HDR}$ and $P_{REF}$. Such Log-Gabors filters are for example introduced in "Relations between the statistics of natural images and the response properties of cortical cells" D. Field, J. Opt. Soc. Am. A4, December 1987, 2379-2394. Subband signals are calculated at different spatial scales and spatial orientations.

Log-Gabor filters are widely used in image analysis and are used here to compare intrinsic characteristics of natural scenes. In our approach, the log-Gabor filters are used in the frequency domain and can be defined in polar coordinates by $h(f, \theta) = H_f \times H_\theta$ with $H_f$ and $H_\theta$ being the radial and angular components, respectively:

$$H_{s,o}(f, \theta) = \exp\left(-\frac{\log(f/f_s)^2}{2\log(\sigma_s/f_s)^2}\right) \times \exp\left(-\frac{(\theta - \theta_0)^2}{2\sigma_0^2}\right) \quad (2)$$

where $H_{s,o}$ is the filter denoted by spatial scale index s and orientation index o, $f_s$ is the normalized center frequency of the scale, $\theta$ is the orientation, $\sigma_s$ defines the radial bandwidth B in octaves with $$B = 2\sqrt{2/\log(2)} * |\log(\sigma_s/f_s)|, \theta_0$$

represents the center orientation of the filter, and $\sigma_0$ defines the angular bandwidth $$\Delta\Omega = 2\sigma_0\sqrt{2/\log(2)}.$$

Video frames $P_{HDR}$ and $P_{REF}$ in the perceived luminance domain are decomposed into a set of subbands by computing the inverse DFT (Discrete Fourier Transform) of the product of the frame's DFT with frequency domain filter defined in the relation (2).

The resulting subband values for the video frames $P_{HDR}$ and $P_{REF}$ are denoted $l_{t,s,o}^{(HDR)}$ and $l_{t,s,o}^{(REF)}$ respectively. Here, $s=1, 2, \ldots, N_{scale}$, $o=1, 2, \ldots, N_{orient}$ and $t=1, 2, \ldots, N_{frame}$, wherein $N_{scale}$ is the total number of scales, $N_{orient}$ is the total number of orientations and $N_{frame}$ is the total number of frames in the sequences HDR and REF.

A similarity map between the subband values $l_{t,s,o}^{(HDR)}$ and $l_{t,s,o}^{(REF)}$ is then computed for each couple of frames t of the sequences HDR and REF at each spatial scale s and each orientation o in a second time.

The similarity map for a frame t at a scale s and an orientation o is computed as follows:

$$Sim_{t,s,o} = \frac{2 \cdot l_{t,s,o}^{(HDR)} \cdot l_{t,s,o}^{(REF)} + k}{\{l_{t,s,o}^{(HDR)}\}^2 + \{l_{t,s,o}^{(HDR)}\}^2 + k} \quad (3)$$

wherein k is a small constant added to avoid division by zero. The similarity map comprises as many pixels as the frames t of the sequences HDR and REF.

Each pixel or point of the similarity map is related to a specific pixel P of the frames t of the sequences HDR and REF. The value of this point is representative of a similarity level between the pixel P of the frame t of the sequence HDR and the pixel P of the frame t of the sequence REF.

A global similarity map $Sim_t$ for the frame t can then be computed by pooling across spatial scales and orientations. Different methods can be used for computing the global similarity map such as those based on contrast sensitivity function(CSF) but a possible bottleneck is that of computing the desired CSF accurately, especially the one which may be applicable for both near-threshold and supra-threshold distortions. Thus, according to preferred embodiment, the global similarity map $Sim_t$ is computed as follows:

$$Sim_t = \frac{1}{N_{scale} \times N_{orient}} \sum_{s=1}^{N_{scale}} \sum_{o=1}^{N_{orient}} Sim_{t,s,o} \quad (4)$$

The global similarity map $Sim_t$ is representative of the similarity level between the frame t of the sequence HDR and the frame t of the sequence REF. The similarity map for the whole video sequence can be represented as $\{Sim_t\}_{t=1}^{N_{frame}}$.

The similarity map $\{Sim_t\}_{t=1}^{N_{frame}}$ helps to quantify the effect of local distortions by assessing their impact across frequency and orientation. This effect can then be exploited via a spatio-temporal analysis in order to calculate a short term quality value in a spatially and temporally localized neighborhood, and subsequently obtain an overall HDR video quality score as described in the following steps.

Step S3

Video signals propagate information along both spatial and temporal dimensions. However, due to visual acuity limitations of the eye, humans fixate their attention to local regions when viewing a video because only a small area of the eye retina, generally referred to as fovea, has a high visual acuity. This is due to higher density of photoreceptor cells cones present in the fovea. Consequently, human eyes have to rapidly shift their gaze (the time between such movements is the fixation duration) to bring localized regions of the visual signal into the fovea field. Thus, humans tend to judge video quality in local context both spatially and temporally, and determine the overall video quality based on those assessments. In other words, the impact of distortions introduced in video frames is not limited just to the spatial dimension but rather manifests spatio-temporally.

Therefore, a possible strategy for objective video quality measurement is by analyzing the video sequence in a spatio-temporal (ST) dimension, so that the impact of distortions can be localized along both spatial and temporal axes.

Figure 3:
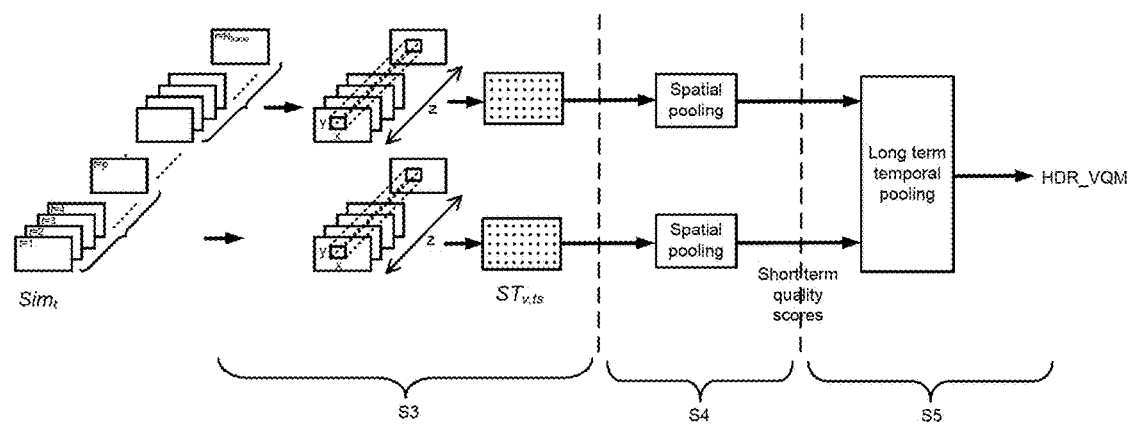
FIG. 3 is a flow chart describing in detail the final steps of the flow chart of FIG. 1.

The next steps will be described in reference to FIG. 1 and FIG. 3. Thus, according to the invention, the similarity maps $\{Sim_t\}_{t=1}^{N_{frame}}$ are each divided into short-term ST (for Spatio-Temporal) tubes defined by a 3-dimensional region with x horizontal, y vertical and the z temporal data points, i.e. a cuboid with dimensions x×y×z, as illustrated in FIG. 3. The axes x and y define the spatial axes while the axis z determines the temporal axis. The values of x and y together define the area of the fixated region. Therefore, these can be computed by taking into account the viewing distance, the central angle of the visual field in the fovea and the display resolution. On the other hand, a good range of z can be determined by considering the average fixation duration when viewing a video sequence. While this can vary due to content and/or distortions, studies related to the analysis of eye-movement during video viewing indicate that values in the range of 300-500 ms (8-12 frames) is a reasonable choice.

In a first step S3, a short term temporal pooling is performed. The aim of this step is to pool or fuse the data in local spatio-temporal neighborhoods and, more specifically, to pool or fuse data present in ST tubes. In the embodiment illustrated by FIG. 3, the ST tubes are non-overlapping tubes. In a variant, they could be partially overlapping.

Keeping in mind that the goal is to characterize the effect of spatial distortions over short term duration which is equal to the fixation time (300-500 ms), a standard similarity deviation value is computed for of each ST tube.

Consequently, a short term error value is computed for each ST tube of a group of q consecutive similarity maps $Sim_t$, q being for example equal to 10 (the standard similarity deviation is computed for 10 consecutive frames of the video sequences HDR and REF).

The determination of the values of x, y and z can be performed as follows. It is assumed that the central angle of the visual field in the fovea is 2°. Then, a quantity W representing the length of the fixated window in terms of number of pixels can be computed as $$W = \tan 2° \times v \times \sqrt{R/D_A} \qquad (5)$$

where V is the viewing distance in cm, R is the display resolution and $D_A$ is the display area. In an example, V=178 cm, R=1080×1920 pixels and $D_A$=6100 cm². Plugging these values into the relation (I) gives W≈115. To reduce the computational effort, the method may be run on down sampled (by a factor of 2) video frames, and hence the approximate length of the fixated window is W/2≈58. Thus the values x and y are set to 64 pixels in order to be nearest to a more standard block size. To determine z, a fixation duration of 400 ms is set and, with a frame rate of 25 frames per second, z=10 frames. The number of scales s and orientations o are for example 5 and 4, respectively, i.e. $N_{scale}$=5 and $N_{orient}$=4. The orientations are equally spaced by 45°.

The short term error values are grouped in a 2D error map, denoted $ST_{v,t_s}$·v represents the spatial coordinates and $t_s$ (=1, 2, ... $N_{frame}$/z) is the index of resulting spatio-temporal frames. The error map comprises a point for each ST tube. By this definition, a video sequence with lower visual quality will have higher localized standard values in the error map $ST_{v,t_s}$ while this will decrease as the signal quality improves.

Thus, the maps $ST_{v,t_s}$ help to quantify signal coherence level in local neighborhoods.

Steps S5 and S6

The next steps S5 and S6 are to perform spatial and long term temporal pooling to obtain an overall video quality score HDR_VQM for the whole sequence HDR. The score HDR_VQM is the visual quality index.

To obtain an overall video quality score that can quantify the level of annoyance in the video sequence, the local errors present in the error maps $ST_{v,t_s}$ are pooled further in two stages:

(a) a spatial pooling is performed in a step S5 to generate a time series of short term quality scores, and (b) a long term temporal pooling is performed in a step S6 to fuse short term quality scores into a single number denoting the overall annoyance level.

These steps are based on the premise that humans evaluate the overall video quality based on continuous assessments of the impact of short term errors or annoyance they came across while viewing the video sequence. Therefore, a spatial pooling S5 is performed on the error maps $ST_{v,t_s}$ in order to obtain short-term quality scores, as illustrated in FIG. 3.

Then, a long term pooling S6 is applied to compute the overall video quality score. The following equation is used for implementing both steps S5 and S6

$$HDR-VQM = \frac{1}{|t_s \in L_p|} \times |v \in L_p| \sum_{t_s \in L_p} \sum_{v \in L_p} ST_{v,t_s} \qquad (6)$$

where $L_p$ denotes the set with lowest p % values (=m lowest values) and | | stands for cardinality of the set. Both short term spatial pooling S5 and long term temporal pooling S6 are preferably performed over the lowest p % values (=m lowest values). This is because the HVS does not process necessarily visual data in its entirety and makes certain choices to minimize the amount of data to be analyzed. It is, of course, non-trivial to realize and integrate such exact HVS mechanisms into an objective method.

The pooling factor p is for example set to 5% but it may be comprised between 5% and 50% without introducing significant changes in the results.

The results of this method have been compared to the quality measurements made by 25 observers (subjective quality measurements). The method of the invention has showed good results.

While example embodiments are capable of various modifications and alternative forms, embodiments thereof are shown by way of example in the drawings and will herein be described in details. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

The method according to the invention which is illustrated by the flow charts of FIGS. 1 and 3, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks. Specific structural and functional details disclosed herein are merely representative for purposes of describing example embodiments of the present invention. This invention may, however, be embodied in many alternate forms and should not be construed as limited to only the embodiments set forth herein.

The invention claimed is:

1. A method for determining a visual quality index of at least one high dynamic range video sequence (HDR sequence), distorted by image processing operations and issued from a reference high dynamic range video sequence, each of the HDR sequence and the reference HDR sequence comprising $N_{frame}$ video frames t, with N≥2 and t∈[1 ... $N_{frame}$], each video frame t comprising a plurality of pixels organized into rows and columns and each pixel having at least a luminance value, the method comprising:

applying a transformation to the video frames t of the HDR sequence and the reference HDR sequence in order to obtain video frames t of the HDR sequence and the reference HDR sequence in a perceived luminance domain, the transformed luminance values of the video frames t in the perceived luminance domain being substantially linear to the luminance values perceived by the human visual system for the HDR sequence and the reference HDR sequence, computing, for each couple of frames t of the HDR sequence and the reference HDR sequence in the perceived luminance domain, $N_{scale} \times N_{orient}$ similarity frames $Sim_{t,s,o}$ representative of a perceptual similarity between the frame t of the HDR sequence and the frame t of the reference HDR sequence at different spatial scales s and different spatial orientations o, with s∈[1 ... $N_{scale}$] and o∈[1 ... $N_{orient}$], a similarity value being associated to each pixel of the similarity frame $Sim_{t,s,o}$, computing, for each couple of frames t of the HDR sequence and the reference HDR sequence, a global similarity frame $Sim_t$ based on the computed similarity frames $Sim_{t,s,o}$ at the different spatial scales s and the different spatial orientations o, pooling, for each group of q consecutive global similarity frames $Sim_t$, with q≥2, and for each one of a plurality of spatio-temporal tubes within said group of q consecutive global similarity frames $Sim_t$, the similarity values of the pixels included in said spatio-temporal tubes in order to generate a short term error value for each said spatio-temporal tubes, the short term error values of each spatio-temporal tube being included into an error map, pooling at least a portion of the short term error values of each error map in order to generate a short term quality score for each group of q consecutive global similarity frames $Sim_t$, and computing the visual quality index of the HDR sequence based on said short term quality scores.

2. The method of claim 1, wherein the portion of the short term error values of each error map comprises the m lowest short term error values of the error map, with m being an integer value lower than the total number of short term error values in the error map.

3. The method of claim 2, wherein the number m is a predetermined percentage of the total number of short term error values in the error map.

4. The method of claim 3, wherein the predetermined percentage is between about 5% and about 50%.

5. The method of claim 1, wherein the method further comprises a preliminary step, before transforming the HDR sequence and the reference HDR sequence into the perceived luminance domain, the preliminary step including transforming the luminance values of the HDR sequence and the reference HDR sequence into emitted luminance values.

6. The method of claim 1, wherein the similarity frame $Sim_{t,s,o}$ associated to the frames t of the HDR sequence and the reference HDR sequence for a spatial scale s and a spatial orientation o is computed by the steps of:

applying a log-Gabor filter to the frame t of the HDR sequence and the frame t of the reference HDR sequence in the perceived luminance domain at the spatial scale s and the spatial orientation o, computing an inverse Fourier Transform of the product of the results of the log-Gabor filter for the frame t of the HDR sequence and the frame t of the reference HDR sequence in order to generate a subband frame $l_{t,s,o}^{(HDR)}$ for the frame t of the HDR sequence and a subband frame $l_{t,s,o}^{(REF)}$ for the frame t of the reference HDR sequence, and computing the similarity frame $Sim_{t,s,o}$ based on the subband frames $l_{t,s,o}^{(HDR)}$ and $l_{t,s,o}^{(REF)}$.

7. The method of claim 1, wherein the global similarity frame $Sim_t$ is defined by the formula:

$$Sim_t = \frac{1}{N_{scale} \times N_{orient}} \sum_{s=1}^{N_{scale}} \sum_{o=1}^{N_{orient}} Sim_{t,s,o}.$$

8. The method of claim 1, wherein the spatio-temporal tubes are non-overlapping spatio-temporal tubes.

9. The method of claim 1, wherein the video frames t of the HDR sequence and the reference HDR sequence in the perceived luminance domain are generated by applying a perceptually uniform encoding to the video frames t of the HDR sequence and the reference HDR sequence or, when appropriate, to the video frames t of the HDR sequence and the reference sequence issued from said preliminary step.

* * * * *